United States Patent
Sato

(10) Patent No.: US 6,560,697 B2
(45) Date of Patent: May 6, 2003

(54) DATA PROCESSOR HAVING REPEAT INSTRUCTION PROCESSING USING EXECUTED INSTRUCTION NUMBER COUNTER

(75) Inventor: Hisakazu Sato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/028,697

(22) Filed: Dec. 28, 2001

(65) Prior Publication Data

US 2002/0056038 A1 May 9, 2002

Related U.S. Application Data

(63) Continuation of application No. 09/347,004, filed on Jul. 2, 1999, now Pat. No. 6,345,357.

(30) Foreign Application Priority Data

Feb. 2, 1999 (JP) .......................................... 11-025238

(51) Int. Cl.[7] .............................................. G06F 9/40
(52) U.S. Cl. ...................... 712/245; 712/227; 712/241
(58) Field of Search ................................ 712/241, 245, 712/227

(56) References Cited

U.S. PATENT DOCUMENTS

| | | | | | |
|---|---|---|---|---|---|
| 5,303,355 | A | * | 4/1994 | Gergen et al. | 712/226 |
| 5,507,027 | A | * | 4/1996 | Kawamoto | 712/241 |
| 5,727,194 | A | * | 3/1998 | Shridhar et al. | 712/241 |
| 5,898,866 | A | * | 4/1999 | Atkins et al. | 712/208 |
| 6,182,209 | B1 | * | 1/2001 | Vlot et al. | 712/230 |

* cited by examiner

*Primary Examiner*—Kenneth S. Kim
(74) *Attorney, Agent, or Firm*—Oblon, Spivak, McClelland, Maier & Neustadt, P.C.

(57) ABSTRACT

A data processor configured to repeatedly perform sequential execution of a plurality of instructions in a program in response to a repeat instruction in the program. The data processor includes a counting circuit configured to count every time one instruction of the plurality of instructions is executed; a judgment circuit configured to judge whether the counting circuit counts a predetermined number of times; and an instruction execution control portion configured to control an execution sequence to return to a head instruction of said plurality of instructions following a last instruction in the plurality of instructions in response to a first result output from the judgment circuit indicating that the counting circuit does not count the predetermined number of times.

17 Claims, 12 Drawing Sheets

FIG. 6
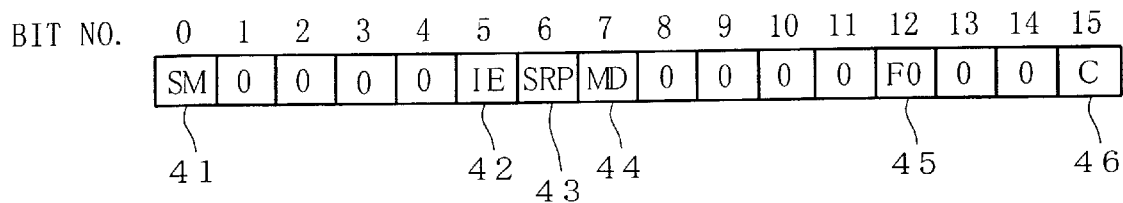
FIG. 7
SREP Rsrs, Label
FIG. 8
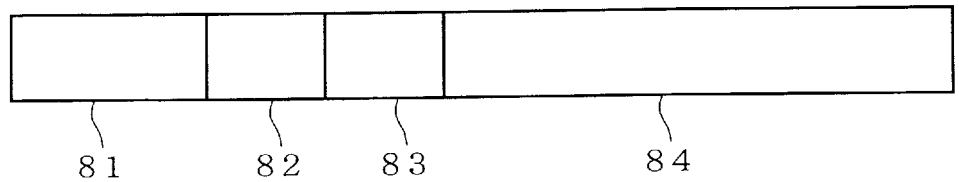
FIG. 9
SREPI imm, Label

FIG. 11

```
INSTRUCTION N      ldi    r12,#h'2400   ;start address of data  ⎫
INSTRUCTION N+1    ldi    r14,#h'2000   ;start address of coef  ⎪
                                                                 ⎪
INSTRUCTION N+2    ld2w   r0,  @r12+                             ⎪
INSTRUCTION N+3    ld2w   r6,  @r14+                             ⎬ INITIALIZATION
INSTRUCTION N+4    ld2w   r2,  @r12+    ||  nop                  ⎪
INSTRUCTION N+5    ld2w   r8,  @r14+    ||  clra  a0             ⎪
                                                                 ⎪
INSTRUCTION N+6    srep   r13, loopend                           ⎭

INSTRUCTION N+7    ld2w   r4,  @r12+    ||  mac   a0,r0,r6   ⎫
INSTRUCTION N+8    ld2w   r10, @r14+    ||  mac   a0,r1,r7   ⎪
INSTRUCTION N+9    ld2w   r0,  @r12+    ||  mac   a0,r2,r8   ⎪
INSTRUCTION N+10   ld2w   r6,  @r14+    ||  mac   a0,r3,r9   ⎬ REPEAT
INSTRUCTION N+11   ld2w   r2,  @r12+    ||  mac   a0,r4,r10  ⎪
         loopend:                                            ⎪
INSTRUCTION N+12   ld2w   r8,  @r14+    ||  mac   a0,r5,r11  ⎭

INSTRUCTION N+13   nop                  ||  rachi r0,a0,#1   } POSTPROCESSING
```

DATA PROCESSOR HAVING REPEAT INSTRUCTION PROCESSING USING EXECUTED INSTRUCTION NUMBER COUNTER

This application is a continuation of application Ser. No. 09/347,004, filed Jul. 2, 1999, now issued U.S. Pat. No. 6,345,357, which claims priority based on Japanese patent application No. 11-025,238, filed Feb. 2, 1999.

BACKGROUND OF THE INVENTION

1. Field of the Invention

The present invention relates to a high-performance data processor, and more particularly to its repeat processing function.

2. Description of the Background Art

In a digital signal processing and the like, repeat executions of instructions are often made. For effective execution, some DSPs (Digital Signal Processors) have a dedicated instruction and a dedicated hardware.

This is called a block repeat and the like, which repeatedly executes an instruction stream designated by a control register the number of times designated by another register. The block repeat is disclosed in, e.g., Chapters 3, 4 and 5 of "TMS3209C5x User's Guide, 1993". This function eliminates necessity of counting of the repeat number, judgment on counting result, a branch instruction from the end to the start of repeatedly-executed instructions and the like. The like example is also disclosed in Japanese Patent Application Laid Open Gazette No. 9-212361 (hereinafter, referred to as "open gazette 1").

In the above open gazette 1, a use of block repeat instructions is shown taking an FIR filter as an example (see FIG. 14 of the open gazette 1). Though it is known in advance that the total number of multiply and add operations is 256 in this case, if the total number of multiply and add operations is not known in advance, more complicated processing is required. That requires a complicated program where the quotient obtained by dividing the total number of multiply and add operations by the number 6 of instructions is designated as a repeat number and the remainder is added after the repeat block, though not discussed in detail.

SUMMARY OF THE INVENTION

The present invention is directed to a data processor operating in accordance with a program. According to a first aspect of the present invention, the data processor has a step repeat function working in response to a step repeat instruction which is written in the program and can designate first to N-th ($N \geq 2$) instructions and an execution instruction number M ($M \geq 1$), for repeating the first to N-th instructions K (the quotient of M/N) times and then execute first to L-th (the remainder of M/N) instructions, and the data processor comprises, for the step repeat function: an execution instruction number judgment portion for counting up the number of instruction execution count every time when any one of the first to N-th instructions is executed, to output an instruction execution number judgment result indicating whether an achievement state where the instruction execution count reaches the execution instruction number M or an unachievement state where does not reach; an instruction fetch portion for repeatedly fetching the first to N-th instructions in the order of first, second, . . . N-th, first, second, . . . . when the step repeat instruction is executed; and an instruction execution control portion sequentially receiving instructions fetched in the instruction fetch portion, for sequentially executing the instructions received from the instruction fetch portion when the instruction execution number judgment result indicates the unachievement state and for negating the instructions received from the instruction fetch portion when the instruction execution number judgment result indicates the achievement state, in execution of the step repeat instruction.

According to a second aspect of the present invention, the data processor of the first aspect further comprises, for the step repeat function: an information storing portion for storing step repeat instruction execution information indicating whether an executing state where the step repeat instruction is being executed or an unexecuting state where is not being executed, the step repeat instruction execution information being set to the executing state when execution of the step repeat instruction begins, and in the data processor of the second aspect, the instruction fetch portion repeatedly fetches the first to N-th instructions (K+1) times when L is not "0", and sets the step repeat instruction execution information to the unexecuting state when the N-th instruction which is (K+1)th fetched is given to the instruction execution control portion, the execution instruction number judgment portion sets the indication of the execution instruction number judgment result to the achievement state during (K+1)th execution of the L-th instruction, and the instruction execution control portion sequentially negates (L+1)th instruction to the N-th instruction which are (K+1)th executed working in response to the execution instruction judgment result indicating the achievement state.

According to a third aspect of the present invention, the data processor of the first aspect further comprises, for the step repeat function: an information storing portion for storing step repeat instruction execution information indicating whether an executing state where the step repeat instruction is being executed or an unexecuting state where is not being executed, the step repeat instruction execution information being set to the executing state when execution of the step repeat instruction begins; and a timing control portion receiving the execution number judgment result, for generating a control signal indicating fetch of an instruction to be executed after execution of the step repeat instruction with a change of the indication of the execution number judgment result from the unachievement state to the achievement state as a trigger and setting the step repeat instruction execution information to the unexecuting state.

According to a fourth aspect of the present invention, the data processor of the first, second or third aspect further comprises: a block repeat function working in response to a block repeat instruction which can designate an instruction stream consisting of a plurality of instructions and a repeat execution number, for executing the instruction stream repeatedly the repeat execution number of times, independent of the step repeat function.

According to a fifth aspect of the present invention, the data processor of the first, second, third or fourth aspect further comprises: a conditional execution function working in response to an execution condition designating instruction defining a predetermined instruction and an execution condition of the predetermined instruction, for executing/suppressing the predetermined instruction by condition judgment, and the data processor of the fifth aspect further comprises, for the conditional execution function: a condition information storing portion for storing condition information; and an execution condition judgment portion working in response to the execution condition designating instruction, for outputting an execution suppressing signal controlling whether the predetermined instruction is executed or suppressed on the basis of whether the condition information satisfies the execution condition or not, and in the data processor of the fifth aspect, the conditional execution function shares the instruction fetch portion and the instruction execution control portion with the step repeat function, the instruction fetch portion fetches the predetermined instruction in parallel to a judgment operation of the execution condition designating instruction by the execution condition judgment portion, and the instruction execution control portion negates the predetermined instruction given by the instruction fetch portion when the execution suppressing signal indicates suppressing.

Preferably, in the data processor, the step repeat function shares the condition information storing portion with the condition execution function, and the condition information storing portion further stores step repeat instruction execution information indicating whether an executing state where the step repeat instruction is being executed or an unexecuting state where is not being executed.

According to a sixth aspect of the present invention, in the data processor of the first, second, third, fourth or fifth aspect, the first to N-th instructions are sequentially written in the program subsequent to the step repeat instruction, and the step repeat instruction further has address information of the N-th instruction.

Preferably, the step repeat instruction has information specifying a register which stores the execution instruction number.

Preferably, the step repeat instruction has information specifying the execution instruction number.

Preferably, the execution instruction number judgment portion comprises: a number storing portion for storing remaining execution number, the execution instruction number being set to the remaining execution number when execution of the step repeat instruction begins; a counting portion for subtracting "1" from the remaining execution number when the remaining execution number is not "0" after each execution of the first to N-th instructions, to store a new remaining execution number to the remaining execution number storing portion; and a zero judgment portion for outputting the execution instruction number judgment result on the basis of whether the remaining execution number is "0" or not.

In the data processor of the first aspect, the instruction execution control portion sequentially executes instructions received from the instruction fetch portion when the execution instruction number judgment result indicates the unachievement state, and sequentially negates the instructions received from the instruction fetch portion when the execution instruction number judgment result indicates the achievement state, in execution of the step repeat instruction.

Therefore, since the first to N-th instructions fetched in the instruction fetch portion can be surely negated after the total execution number of the first to N-th instructions reaches the execution instruction number, the instructions included in the instruction stream (the first to N-th instructions) can be executed accurately, the designated number of times of the instructions (execution instruction number) while being repeated.

In the data processor of the second aspect, the execution instruction number judgment portion sets the indication of the execution instruction number judgment result to the achievement state during (K+1)th execution of the L-th instruction (M-th executed), and the instruction execution control portion sequentially negates the (K+1)th execution of the (L+1)th to N-th instructions in response to the execution instruction judgment result indicating the achievement state.

Therefore, after the total execution count of the first to N-th instructions reaches the execution instruction number, the (L+1)th to N-th instructions fetched in the instruction fetch portion can be surely negated.

In the data processor of the third aspect, the timing control portion generates the control signal indicating fetch of an instruction to be executed after execution of the step repeat instruction with the change of the indication of the execution number judgment result from the unachievement state to the achievement state as a trigger and sets the step repeat instruction execution information to the unexecuting state.

Therefore, after the total execution count of the first to N-th instructions reaches the execution instruction number, an execution to be executed after execution of the step repeat instruction can be immediately executed.

Since the data processor of the fourth aspect further has the block repeat function, a programmer can use either the block repeat processing or the step repeat processing as required.

In the data processor of the fifth aspect, since the step repeat function and the conditional execution function share the instruction fetch portion and the instruction execution control portion, both the step repeat function and the conditional execution function can be achieved while the hardware cost is reduced to the minimum.

In the data processor of the sixth aspect, the first to N-th instructions are sequentially written subsequent to the step repeat instruction in a program and the step repeat instruction further has an address information of the N-th instruction.

Therefore, when the step repeat instruction is executed, by recognizing the address of an instruction subsequent to the step repeat instruction as the address of the first instruction and the address of the N-th instruction from the address information of the N-th instruction, an address control to execute the first instruction after the N-th instruction in execution of the step repeat instruction.

An object of the present invention is to provide a data processor capable of accurately executing instructions in a predetermined instruction stream the designated number of times of instructions while repeating the instructions.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustration of a configuration of a PSW unit;

FIG. 7 is an illustration showing mnemonic of a step repeat instruction;

FIG. 8 is an illustration showing a format of a step repeat instruction;

FIG. 9 is an illustration showing another mnemonic of a step repeat instruction;

FIG. 11 is an illustration showing an example of program using a step repeat function;

DESCRIPTION OF THE PREFERRED EMBODIMENTS

Basic Configuration

Figure 1:
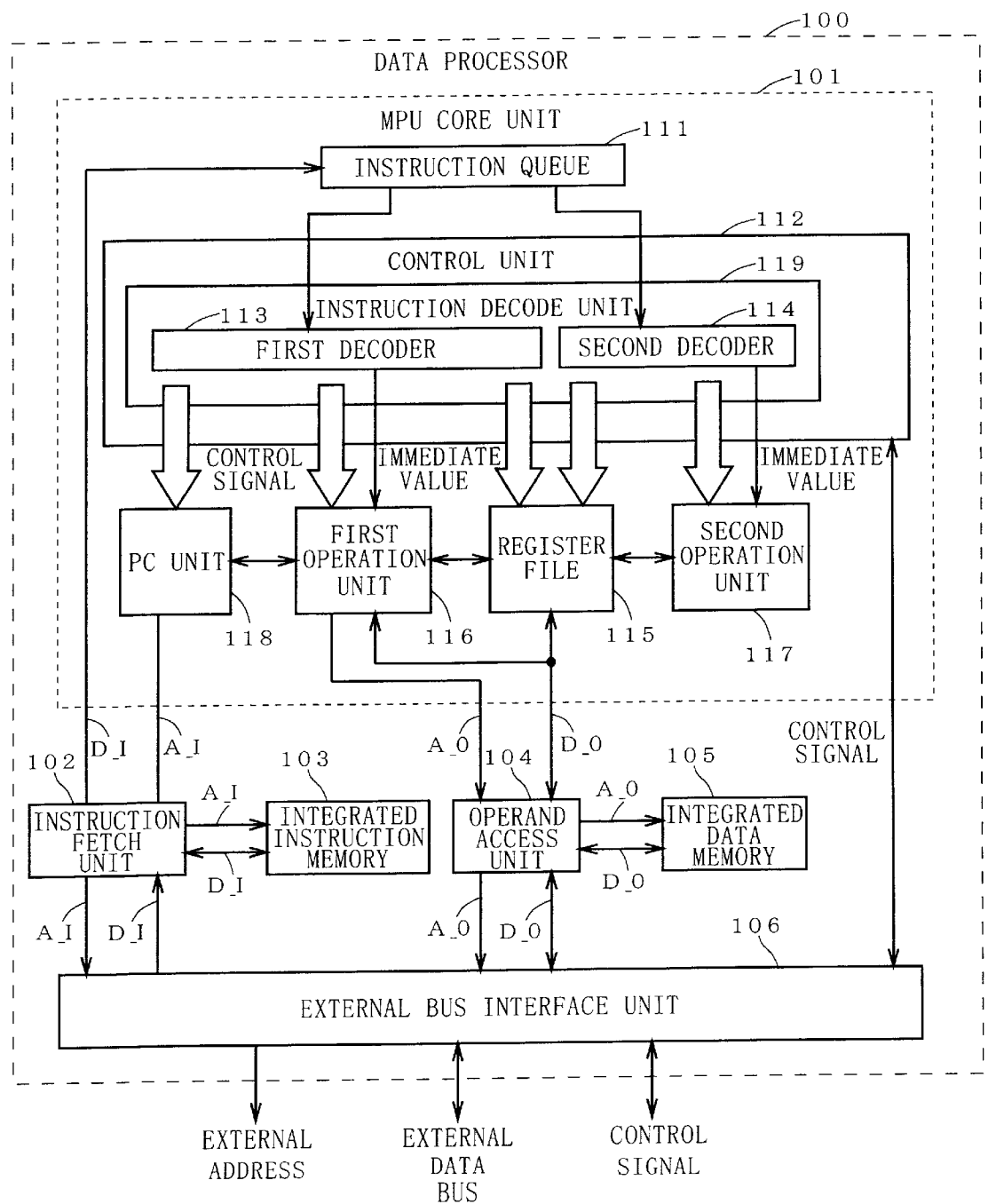
FIG. 1 is a block diagram showing a configuration of a data processor in accordance with a preferred embodiment of the present invention.

FIG. 1 shows a function block configuration of a data processor 100 of this preferred embodiment. The data processor 100 comprises an MPU core unit 101, an instruction fetch unit 102 for accessing instruction data in response to a request from the MPU core unit 101, an integrated instruction memory 103, an operand access unit 104 for accessing operand data in response to a request from the MPU core unit 101, an integrated data memory 105 and an external bus interface unit 106 for arbitrating requests from the instruction fetch unit 102 and the operand access unit 104 to make access to an external memory of the data processor 100 and the like.

The MPU core unit 101 includes an instruction queue 111, a control unit 112, a register file 115, a first operation unit 116, a second operation unit 117 and a PC unit 118.

The instruction queue 111 consists of a 2-entry 32-bit instruction buffer, a valid bit, an input/output pointer and so on, and is controlled in a FIFO (First-In First-Out) order. The instruction queue 111 temporarily holds the instruction data fetched by the instruction fetch unit 102 and transfer the data to the control unit 112.

The control unit 112 performs all the controls in the MPU core unit 101, such as control of instruction queue 111, the pipeline control, execution of the instructions and the interface between the internal elements such as the instruction fetch unit 102 and the operand access unit 104 and external elements. The control unit 112 has an instruction decode unit 119 for decoding instruction codes transferred from the instruction queue 111. The instruction decode unit 119 includes two decoders: a first decoder 113 decodes instructions to be executed in the first operation unit 116 and a second decoder 114 decodes instructions to be executed in the second operation unit 117.

When two short instructions are sequentially executed, an instruction to be first executed is decoded while an instruction to be later executed is decoded by a not-shown pre-decoder to judge which decoder should be used for its decoding. When the instruction to be later executed can be decoded by either decoder, it should be decoded by the first decoder 113. After decoding the instruction to be first executed, the code of the instruction to be later executed is fetched into the selected decoder and decoded therein.

The register file 115 holds values of a plurality of registers, being connected to the first operation unit 116, the second operation unit 117, the PC unit 118 and the operand access unit 104 with a plurality of buses.

Figure 2:
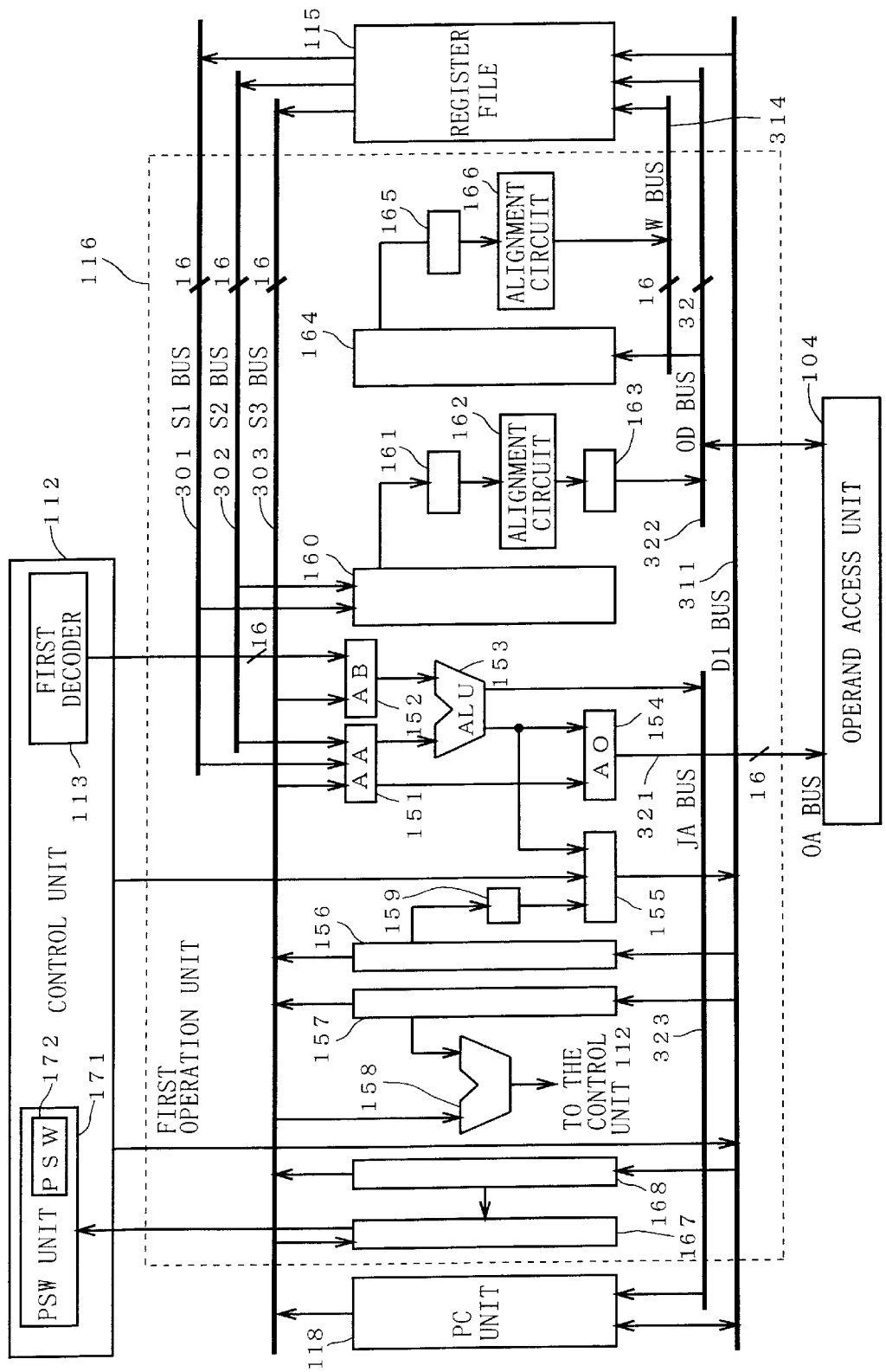
FIG. 2 is a detailed block diagram showing a first operation unit of the data processor in accordance with the preferred embodiment of the present invention.

FIG. 2 shows a detailed block configuration of the first operation unit 116. The first operation unit 116 is connected to the register file 115 with an S1 bus 301, an S2 bus 302 and an S3 bus 303, and reads data out from the register file 115 through the three buses 301 to 303 to transfer data serving as read operands or to be stored to an arithmetic unit and the like. The S1 bus 301 is connected only to even-numbered registers and the S2 bus 302 is connected only to odd-numbered registers. The S1 bus 301 and the S2 bus 302 can come together to transfer 2-word data from paired registers in parallel. The S3 bus 303 is connected to all the registers.

The first operation unit 116 is connected to the register file 115 with a D1 bus 311 and a W bus 314, and transfers operation results and transfer data to the register file 115 over the D1 bus 311 and loaded byte data to the register file 115 over the W bus 314. Both The D1 bus 311 and the W bus 314 are connected to all the registers. The register file 115 is further connected to the operand access unit 104 with a 32-bit OD bus 322, and can thereby transfer 1-word data or 2-word data from paired registers. The high-order/low-order 16 bits on the OD bus 322 are connected to all the registers in the register file 115 so as to be written into any of the registers.

An AA latch 151 and an AB latch 152 are input latches for an ALU 153. The AA latch 151 fetches a register value read out over the S1 bus 301, S2 bus 302 and S3 bus 303. The latch 151 also has a zero-clear function. The AB latch 152 fetches a register value read out over the S3 bus 153 or 16-bit immediate value resulted from decoding by the first decoder 113, and also has a zero-clear function.

The ALU 153 mainly performs transfer, comparison, arithmetic and logic operation, calculation/transmission of operand address, increment/decrement of operand address values, calculation/transfer of jump-target addresses and the like. Results of operation and address-modification are written back to a register designated by an instruction of the register file 115 through a selector 155 over the D1 bus 311. To execute a condition setting instruction to write "1" into a register when a designated condition is satisfied and "0" when not satisfied, the selector 155 has a function of filling the least significant bit of the operation result with data outputted from the control unit 112. In this case, the operation result is controlled to be zero. An AO latch 154 holds operand addresses, and selectively holds an address calculation result from the ALU 153 or a base address value held in the AA latch 151 and outputs the held data to the operand access unit 104 over an OA bus 321. When the ALU 153 calculates a jump-target address and a repeat end address, the calculation result from the ALU 153 is transferred to the PC unit 118 over a JA bus 323.

An MOD_S 156 and an MOD_E 157 are control registers corresponding to registers CR10 and CR11 of FIG. 1, respectively. A comparator 158 compares a value of the MOD_E 157 with the base address value of the S3 bus 303 and transfer the comparison result to the control unit 112. When a modulo-addressing is in an enable state and the comparison result of the comparator 158 indicates agreement in a register indirect mode with postincrement/decrement, a value of the MOD_S 156 held in the latch 159 is written back to a register designated as a base address register in the register file 115 through the selector 155 over the D1 bus 311.

A store data (SD) register 160, which consists of two 16-bit registers, temporarily holds store data outputted to either or both of the S1 bus 301 and the S2 bus 302. The data held in the SD register 160 are transferred to an alignment circuit. 162 through a latch 161. In the alignment circuit 162, the store data is aligned in 321-byte boundary in accordance with the operand address and outputted to the operand access unit 104 through a latch 163 over the OD bus 322.

Byte data loaded by the operand access unit 104 are fetched in a 16-bit load data (LD) register 164 over the OD bus 322. The value of the LD register 164 is transferred to an alignment circuit 166 through a latch 165. The alignment circuit 166 performs a byte alignment and zero/sign extension of the byte data. The aligned or extended data are written into a register designated in the register file 115 over the W bus 314. In a case of 1-word (16-bit) load or 2-word (32-bit) load, the loaded value is directly written into the register file 115 from the OD bus 322, not through the LD register.

A PSW unit 171 in the control unit 112 includes a PSW latch 172, a PSW update circuit and the like, and updates a value of the PSW latch 172 with the operation result or by execution of instructions. When a value is transferred to the PSW latch 172, only required bits (assigned bits) out of the data on the S3 bus 303 are transferred through a TPSW latch 167. When a value is read out from the PSW latch 172, the value is outputted from the PSW unit 171 to the D1 bus 311 and written into the register file 115. When an exception is served, a PSW value on the D1 bus 311 is written into a BPSW latch 168. When a value of the BPSW latch 168 is transferred to the register file 115, the value of the BPSW latch 168 is read out to the S3 bus 303 and transferred to the register file and the like as required. As to an unassigned bit, "0" is forcefully outputted to the S3 bus 303. On return from the exception, only required bits (assigned bits) out of the value of the BPSW latch 168 are transferred to the PSW latch 172 directly through the TPSW latch 167.

Figure 3:
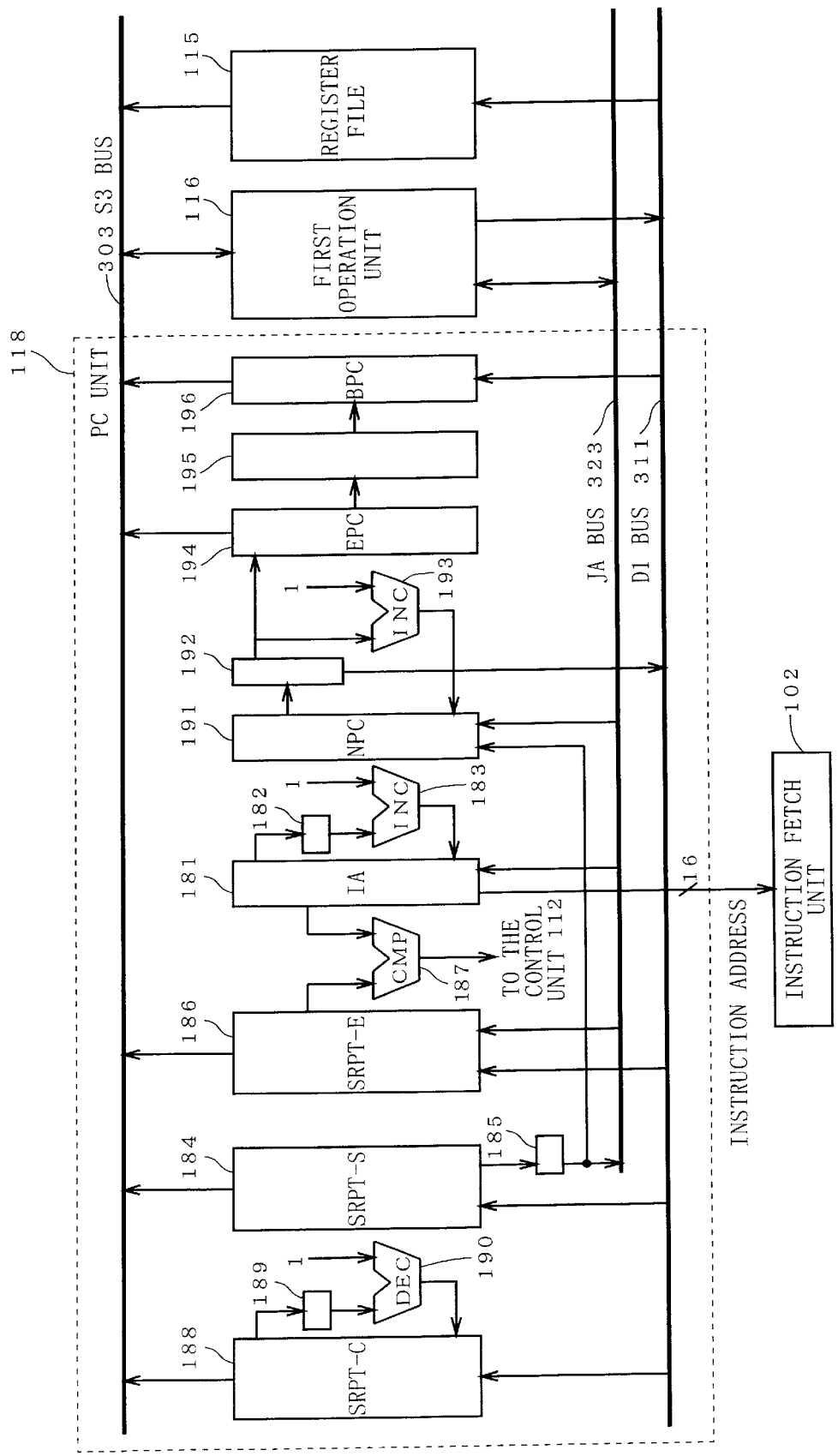
FIG. 3 is a detailed block diagram showing a PC unit of the data processor in accordance with the preferred embodiment of the present invention.

FIG. 3 is a detailed block diagram of the PC unit 118. An instruction address (IA) register 181 holds the address of the next instruction to be fetched and outputs the address of the next instruction to the instruction fetch unit 102. When a subsequent instruction is fetched, the address value transferred from the IA register 181 through a latch 182 is incremented by "1" in an incrementor 183 and then written back to the IA register 181. If a jump, a repeat or the like changes the sequence, the IA register 181 fetches a jump-target address or a repeat block start address transferred over the JA bus 323.

An SRPT_S register 184, an SRPT_E register 186 and an SRPT_C register 188 are control registers for controlling a step repeat. The SRPT_S register 184 stores the address of the first instruction in an instruction stream to be step-repeat-processed, the SRPT_E stores the address of the last instruction in the instruction stream to be step-repeat-processed and the SRPT_C register 188 stores the number of executions of instructions in the instruction stream to be step-repeat-processed.

The last address is calculated by the first operation unit 116 in the step repeat processing, and fetched into the SRPT_E register 186 over the JA bus 323. A comparator 187 compares a value of the SRPT_E register 186 which holds the address of the last instruction in a block to be step-repeat-processed with a value of the IA register 181 which holds a fetch address and outputs the comparison result to the control unit 112.

If the value of SRPT_C register 188 is more than "1" during the step repeat processing, the start address of the block to be step-repeat-processed in the SRPT_S register 184 is transferred to the IA register 181 through a latch 185 over the JA bus 323.

During the step repeat processing, every time when one instruction of the instruction stream in a step repeat group is executed, the value of the SRPT_C register 188 is decremented by "1" by a decrementor 190. When the decremented value is "0", no more decrementing is performed.

The SRPT_S register 184, the SRPT_E register 186 and the SRPT_C register 188 each has an input port connected to the D1 bus 311 and an output port connected to the S3 bus 303, where initialization and saving and returning are performed during the step repeat processing as required.

An execution stage PC (EPC) 194 holds the PC value of an instruction being executed and the next-instruction PC (NPC) 191 holds the PC value of the next instruction. The NPC 191 fetches a jump-target address value on the JA bus 323 if a jump occurs in the execution stage, and fetches the first address of a block to be repeated from the latch 185 if a branch occurs in a repeat operation. Otherwise, a value of NPC 191 transferred through a latch 192 is incremented by the incrementor 193 and written back into the NPC 191. In a case of subroutine jump instruction, a value of the latch 192 is outputted to the D1 bus 311 as a return address and written back into a register (referred to temporarily as "register R13") defined as a link register in the register file 115. When the next instruction comes into execution, the value of the latch 192 is transferred to the EPC 194. To make a reference to the PC value of the instruction being executed, the value of the EPC 194 is outputted to the S3 bus 303 and transferred to the first operation unit 116. When exception or interruption is found, the value of the EPC 194 is transferred to the BPC 196 through a latch 195. The BPC 196 has an input port connected to the D1 bus 311 and an output port connected to the S3 bus 303 and performs saving and returning as required.

Figure 4:
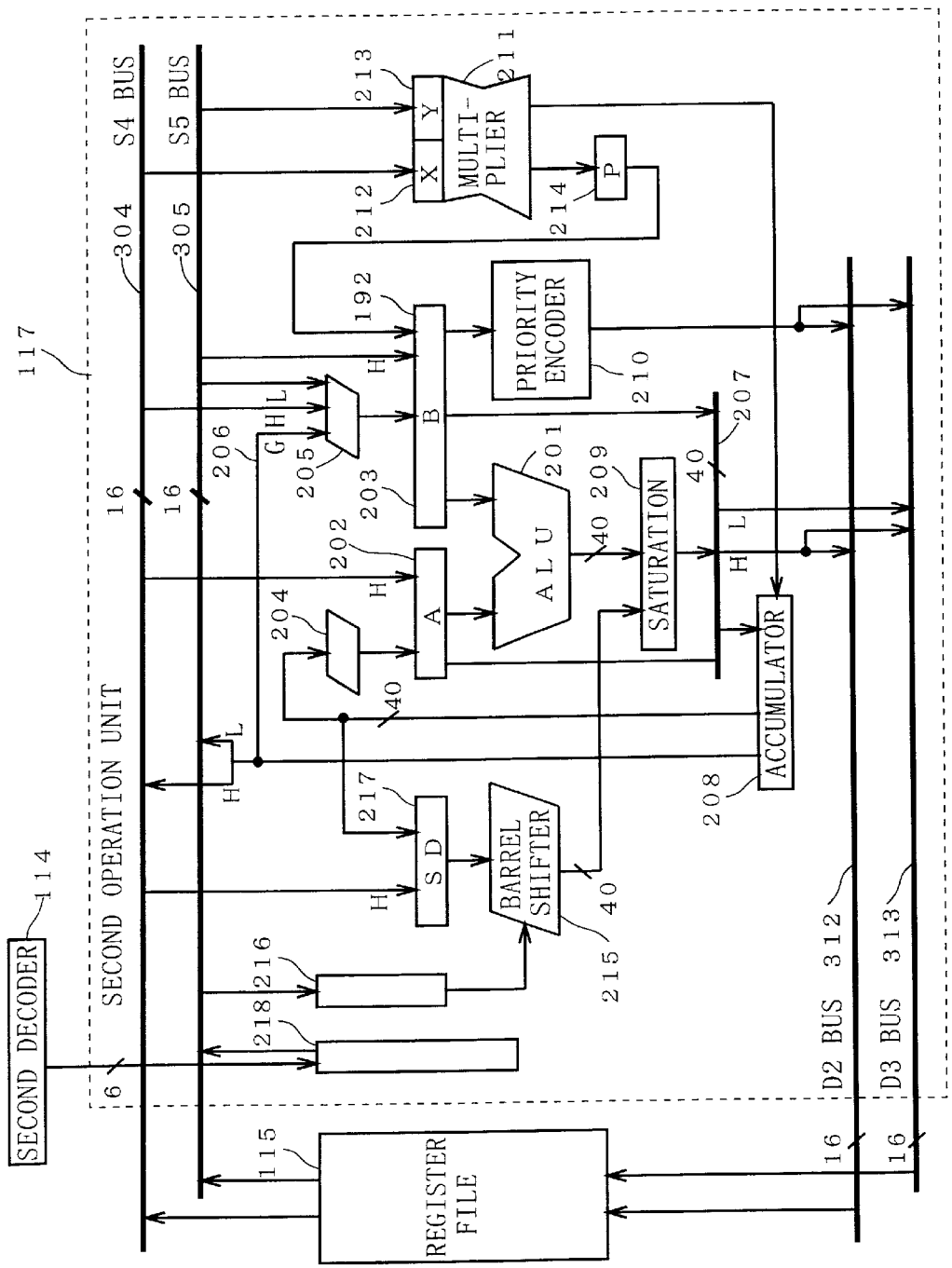
FIG. 4 is a detailed block diagram showing a second operation unit of the data processor in accordance with the preferred embodiment of the present invention.

FIG. 4 is a detailed block diagram of the second operation unit 117. The second operation unit 117 is connected to the register file 115 with an S4 bus 304 and an S5 bus 305, and reads data out from the register file 115 over the S4 bus 304 and the S5 bus 305. The S4 bus 304 and the S5 bus 305 can come together to transfer 2-word data of paired registers in parallel. Further, the second operation unit 117 is connected to the register file 115 with a D2 bus 312 and a D3 bus 313, and can write data into the registers in the register file 115 over the two buses 312 and 313. The D2 bus 312 is connected only to even-numbered registers and the D3 bus 313 is connected only to odd-numbered registers. The D2 bus 312 and the D3 bus 313 can come together to transfer 2-word data of paired registers in parallel.

A 40-bit ALU 201 includes an 8-bit adder ranging from the bit No. 0 to the bit No. 7 for addition of the guard bit of the accumulator, a 16-bit arithmetic and logic unit ranging from the bit No. 8 to the bit No. 23 and a 16-bit adder ranging from the bit No. 24 to the bit No. 39 for addition of the low-order 16 bits of the accumulator. The ALU 201 performs addition and subtraction of up to 40 bits and a logic operation of 16 bits.

An A latch 202 and a B latch 203 are 40-bit input latches for the ALU 201. The A latch 202 fetches a register value from the S4 bus 304 into the location ranging from the bit No. 8 to the bit No. 23, or fetches a value from the accumulator 208 not changed or arithmetically shifted right by 16 bits through a shifter 204. A shifter 205 fetches the value from the accumulator 208 over an interconnection line 206 (8 guard bits), the S4 bus 304 (the high-order 16 bits) and the S5 bus 305 (the low-order 16 bits), or fetches the register value of 16 bits or 32 bits right aligned over only the S5 bus 305 or both the S4 bus 304 and the S5 bus 305, and then sign-extends it into 40 bits. The shifter 205 arithmetically shifts the inputted data by any shift count in a range of 3 bits left to 2 bits right and outputs the shifted data. The B latch 203 fetches the data on the S5 bus 305 at the location ranging from the bit No. 8 to the bit No. 23, or an output from a multiplier or the shifter 205. The A latch 202 and the B latch 203 each have a zero-clear or a constant-value setting function, respectively.

An output form the ALU 201 is given to a saturation circuit 209. The saturation circuit 209 has a function of clipping data into the maximum value or the minimum value in 16-bit or 32-bit representation with reference to the guard bit in order to limit the high-positioned value to 16 bits or combine the high-positioned value and the low-positioned value into 32 bits. The saturation circuit 209 naturally has a function of outputting the data without clipping. An output from the saturation circuit 209 is connected to an interconnection line 207.

When a destination operand designates the accumulator 208, a value on the interconnection line 207 is written into the accumulator 208. When a destination operand designates a register, the value on the interconnection line 207 is written into the register file 115 over the D2 bus 312 and the D3 bus 313. In a case of 1-word transfer, the value on the interconnection line 207 is outputted to the D2 bus 312 when the number of the destination register is even and to the D3 bus 313 when the number is odd. In a case of 2-word transfer, the higher 16-bit data are outputted to the D2 bus 312 and the lower bit data are outputted to the D3 bus 313. To execute a transfer instruction, an absolute-value calculating instruction, a maximum-value setting instruction and a minimum-value setting instruction, outputs from the A latch 202 and the B latch 203 are connected to the interconnection line 207, to be thereby transferred to the accumulator 208 and the register file 115.

A priority encoder 210 fetches the value of the B latch 203, calculates a shift count value needed to normalize a value as fixed point format and outputs the calculation result to the D2 bus 312 or the D3 bus 313 to write it back into the register file 115.

An X latch 212 and a Y latch 213 are input registers of an adder 211, and have functions of fetching 16-bit values on the S4 bus 304 and the S5 bus 305, respectively, and performing zero-extension or sign-extension of the fetched 16-bit value into 17 bits. The multiplier 211 is a 17- by 17-bit multiplier and multiplies a value stored in the X latch 212 by a value stored in the Y latch 213. In a case of multiply-add instruction or multiply-subtraction instruction, the multiplication result is fetched in a P latch 214 and then transferred to the B latch 203. When a destination operand of the multiplication instruction designates the accumulator 208, the multiplication result is written into the accumulator 208.

A barrel shifter 215 can perform an arithmetic/logic shift on 40-bit or 16-bit data by up to 16 bits left and right. The value held in the accumulator 208 or the register value transferred over the S4 bus 304 is given to a shift data (SD) latch 217 as data to be shifted. The immediate value or the register value transferred over the S5 bus 305 is given to a shift count (SC) latch 216 as a shift count. The barrel shifter 215 performs shifting of the data held in the SD latch 217 by the shift count designated by the SC latch 216 according to the operation code. The shifted result is outputted to the saturation circuit 209. The saturation circuit 209 performs saturation arithmetic of the shifted result, like the operation result from the ALU, as required, and gives the result to the interconnection line 207. The value on the interconnection line 207 is written back into the accumulator 208 or the register file 115 over the D2 bus 312 and the D3 bus 313.

An immediate-value latch 218 extends a 6-bit immediate value generated by the second decoder 114 into a 16-bit value and holds it. Then, the value held in the immediate-value latch 218 is transferred to the arithmetic unit over the S5 bus 305. A bit mask for bit manipulation instruction is generated therein.

Figure 5:
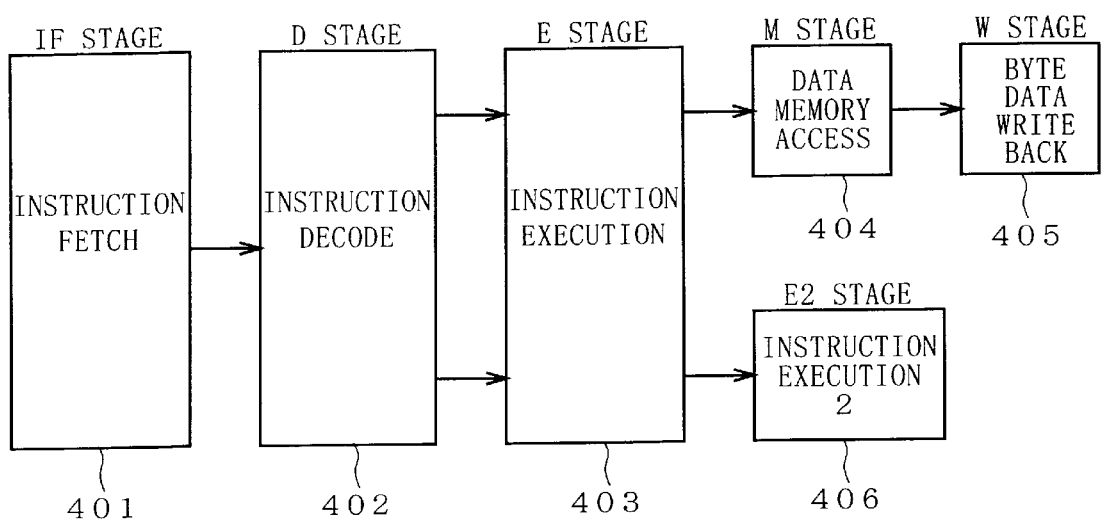
FIG. 5 is a schematic diagram showing a pipeline processing of the data processor in accordance with the preferred embodiment of the present invention in detail.

Next, a pipeline processing in the present data processor will be discussed. FIG. 5 illustrates the pipeline processing. The present data processor performs 5-stage pipeline processing: an instruction-fetch (IF) stage 401 for fetching instruction data; an instruction-decode (D) stage 402 for decoding instructions; an instruction-execution stage (E) 403 for performing operations; a memory-access (M) stage 404 for accessing a data memory; and a write-back (W) stage 405 for writing byte operands loaded from the memory into a register. Writing of the operation result obtained in the E stage 403 is completed in the E stage 403. Writing of 1-word (2-byte) or 2-word (4-byte) loaded data into the register is completely in the M stage 404. To perform multiply-add/multiply-subtract operations, further 2 stages of pipeline processing including multiplication and addition are needed to execute instructions. The latter-stage processing is referred to as an instruction-execution 2 (E2) stage 406. In execution of consecutive multiply-add/multiply-subtract operations, one operation can be performed in one clock-cycle.

In the IF stage 401, mainly, a fetch of instructions, management of the instruction queue 111 and repeat control are performed. The IF stage 401 controls the operations of the instruction fetch unit 102, the integrated instruction memory 103, the external bus interface unit 106, the instruction queue 111, the IA register 181, the latch 182, the incrementor 183 and the comparator 187 in the PC unit 118, and parts of the control unit 112 to achieve an IF stage control, an instruction fetch control and a control of the PC unit 118. The IF stage 401 is initialized by a jump at the E stage 403.

A fetch address is held in the IA register 181. If a jump occurs in the E stage 403, the IA register 181 fetches the jump-target address over the JA bus 323 and perform initialization. To sequentially fetch the instruction data, the incrementor 183 increments the address. During the step repeat processing, if the comparator 187 detects agreement between the value held in the IA register 181 and the value held in the SRPT_E register 186 and the value held in the SRPT_C register 188 is more than "1", the sequence is controlled to change over. In this case, the value held in the SRPT_S register 184 is transferred to the IA register 181 through the latch 185 over the JA bus 323.

The value held in the IA register 181 is transferred to the instruction fetch unit 102 which in turn fetches the instruction data. If the corresponding instruction data are found in the integrated instruction memory 103, the instruction code is read out from the integrated instruction memory 103. In this case, fetch of 32-bit instruction is completed in one clock-cycle. If the corresponding instruction data are not found in the integrated instruction memory 103, an instruction-fetch request is given to the external bus interface unit 106. The external bus interface unit 106 arbitrates between the instruction-fetch request and a request from the operand access unit 104. When the instruction-fetch request is accepted, the external bus interface unit 106 fetches the instruction data from an external memory and transfers the fetched instruction data to the instruction fetch unit 102. The external bus interface unit 106 can access the external memory in a minimum of 2 clock-cycles. The instruction fetch unit 102 transfers the fetched instruction to the instruction queue 111. The instruction queue 111 holds two entries and outputs the instruction code fetched under FIFO control to the instruction decoding unit 119.

In the D stage 402, the instruction decoding unit 119 decodes an operation code and generates a group of control signals for controlling the first operation unit 116, the second operation unit 117 and the PC unit 118 to execute instructions. The D stage 402 is initialized by a jump at the E stage 403. If the instruction code transferred from the instruction queue 111 is invalid, the D stage 402 is idle and waits for fetching a valid instruction code. If the next operation can not be started in the E stage 403, the control signal to be transferred to the arithmetic unit and the like is negated to wait for completion of the preceding operation in the E stage 403. Such a condition occurs, for example, when the instruction being executed in the E stage 403 performs a memory access and the preceding memory access in the M stage 404 is not completed.

The D stage 402 also performs division of two instructions to be sequentially executed and sequence control of instructions to be executed in two cycles. Further, the D stage 402 performs checking of a conflict of load operands using a scoreboard register (not shown) and a conflict of operations by arithmetic units in the second operation unit 117. When any of these conflicts is detected, the control signal is not permitted to output until the conflict is resolved.

Step Repeat Processing

An SRP bit 43 in a processor status word (PSW) shown in FIG. 6 indicates whether the step repeat processing is being performed or not. When "1" is set to the SRP bit 43, the step repeat processing is being performed. The SRP bit 43 is set by execution of a step repeat instruction and cleared by completion of the step repeat processing. Further, any value can be set by usual data transfer operation on the PSW, and the set value is saved in a backup register when interruption or exception occurs. Detecting the completion of the step repeat processing will be discussed later.

An SM bit 41 indicates a stack mode. The SM bit 41 of "0" indicates an interruption mode and that of "1" indicates a user mode. The bit No. 5 of the PSW is an IE bit 42 designating an interruption enable. The IE bit 42 of "0" masks interruption (not accepting the interruption even when asserted) and that of "1" accepts the interruption. The bit No. 7 of the PSW is an MD bit 44 designating a modulo enable. The MD bit 44 of "0" disables modulo addressing and that of "1" enables the module addressing. The bit No. 12 of the PSW is an execution flag (F0 flag) 47 to which a comparison result of a comparison instruction is set. The bit No. 15 is a carry flag (C flag) 49 to which a carry in execution of add/subtract instruction is set.

The step repeat instruction is executed to set predetermined values to the SRPT_S register 184, the SRPT_E register 186 and the SRPT_C register 188 while setting "1" to the SRP bit 43. FIG. 7 illustrates mnemonic of a step repeat instruction SREP which is executed in two clock cycles.

In the first execution cycle, the first operation unit 116 adds an instruction address value of the SREP instruction to a value designated by the third term Label, and sets the addition result to the SRPT_E register 186 over the JA bus. The instruction address of the SREP instruction is read in the first operation unit 116 through the EPC 194 over the S3 bus 303. A transfer path of the third term Label of FIG. 7 is not shown. At the same time, the next instruction address of the SREP instruction is read out from the NPC 191 and set to the SRPT_S register 184 over the D1 bus 311.

In the second execution cycle, a value read out from a register designated by the second term Rsrs of FIG. 7 is given to the first operation unit 116 over the S3 bus 303, going through the first operation unit 116, and set to the SRPT_C register 188 over the D1 bus 311. At this time, "1" is set to the SRP bit 43. The step repeat instruction is a n instruction to be assigned to a bit map of FIG. 8.

As shown in FIG. 8, a code indicating the SREP instruction, a register number designated by Rsrs and a value designated by Label are stored in fields 81, 83 and 84, respectively. At this time, "0" is set to a field 82 which is not used. Further, when the number of instructions to be executed in an instruction stream to be repeated is known in advance, an SREPI instruction can be used. FIG. 9 illustrates mnemonic of the SREPI instruction. The second term designates a value to be set in the RPT_C 188, which is to be stored in a total region of the fields 82 and 83.

The First Preferred Embodiment

Figure 10:
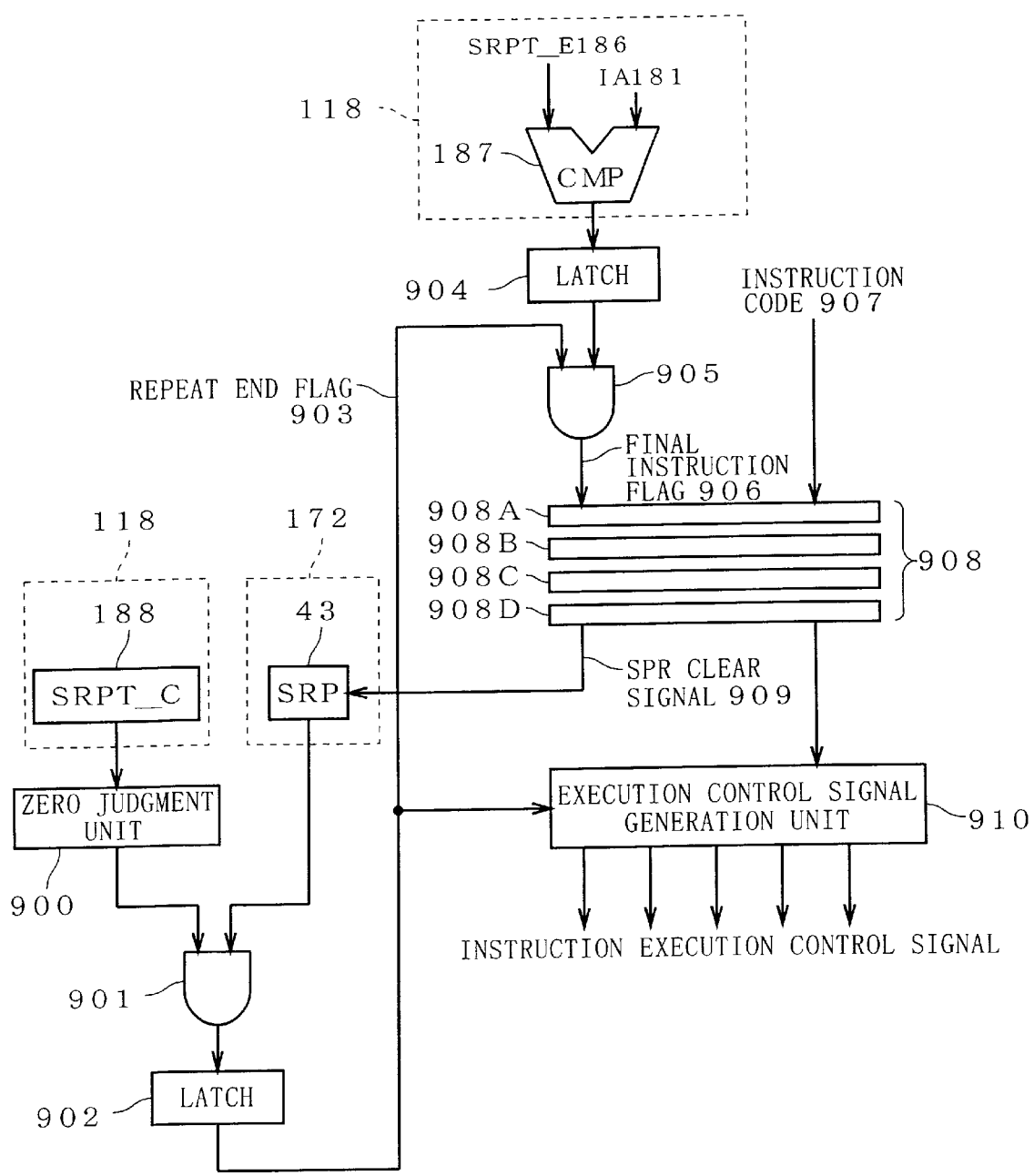
FIG. 10 is an illustration of a control unit in accordance with a first preferred embodiment of the present invention.

FIG. 10 illustrates a configuration of the control unit 112 in a data processor in accordance with the first preferred embodiment of the present invention. In FIG. 10, an execution control signal generation unit 910 is a block for generating a write enable signal for enabling a write to a general-purpose register and a control register, an update signal for an operation flag, a write request signal for requesting a write to a memory and so on, and generates update control signals for all the resources (hardware resources) that are recognizable by a programmer. Some control signals unrelated to updates of the resources that are recognizable by the programmer are generated in other blocks (not shown).

The execution control signal generation unit 910 is given a repeat end flag 903, an instruction code 907 and a last instruction flag 906 which are transferred through a group 908 of data latches. The group 908 of data latches performs pipeline transfer of the instruction code 907 fetched in an instruction fetch stage to a stage where an execution control signal generation unit 910 operates.

The group 908 of data latches consists of data latches 908A to 908D taking half clock to perform the pipeline transfer. Accordingly, in a transfer of one instruction code 907, the data latch 908A latches the instruction code 907 during "L" period of a clock in the instruction fetch stage, the data latch 908B latches the instruction code 907 during "H" period of a clock in a decode stage, the data latch 908C latches the instruction code 907 during "L" period of the clock in the decode stage and the data latch 908D latches the instruction code 907 during "H" period of a clock in an instruction execution stage.

The repeat end flag 903 indicates that the step repeat processing is being performed and instruction executions have been completely made the execution instruction number of times initially designated in the SRPT_C register 188. The repeat end flag 903 is asserted when the SRPT_C register 188 indicates "0" and the SRP bit 43 indicates "1". As shown in FIG. 10, the repeat end flag 903 is obtained by calculating a logic product of an output from a zero judgment unit 900 and the value of the SRP flag 43 with an AND gate 901, and is thereafter outputted in accordance with a desired phase. The zero judgment unit 900 outputs "1" when the value of the SRPT_C register 188 is "0".

The execution control signal generation unit 910 basically generates execution control signals sequentially based on the instruction codes 907 given through the group 908 of data latches to execute the instructions designated by the instruction codes 907. When the repeat end flag 903 is asserted (the execution instruction number of instruction executions has been completed), the execution control signal is negated, regardless of the indication of the instruction code 907. As a result, all the instructions executed during a period while the repeat end flag 903 is asserted lead to an operation like NOP, being negated.

On the other hand, the last instruction flag 906 indicates whether or not the step repeat processing is being performed, instruction executions have been completely made the number of times designated in the SRPT_C register 188 and the instruction code 907 fetched in the instruction fetch stage is the last instruction of the instruction stream to be step-repeat-processed, with "1" or "0". The last instruction flag 906 is obtained by calculating a logic product of an output of the comparator 187 in the PC unit 118 and the repeat end flag 903 with an AND gate 905. The comparator 187 compares the SRPT_E register 186 with the IA 181 and outputs "1" when they agree.

The last instruction flag 906 is pipeline-transferred, together with the instruction code 907 and becomes an SRP clear signal 909 when the corresponding instruction code 907 is executed. The SRP bit 43 is cleared to "0" by receiving the SRP clear signal 909.

FIG. 11 illustrates an example of an FIR filter processing using a step repeat function by the control unit in accordance with the first preferred embodiment of FIG. 10. In FIG. 11, the instruction N+6 is a step repeat instruction, and an address of the instruction N+7, an address of the instruction N+12 and a value stored in the register R13 are set in the SRPT_S register 184, the SRPT_E register 186 and the SRPT_C register 188, respectively. The sign "||" represents a parallel execution of two instructions.

With this, the six instructions N+7 to N+12 are repeatedly fetched and the instructions are executed the times corresponding to the value (execution instruction number) set in the register R13 in advance. For example, when "128" is set in the register R13, the instructions N+7 to N+12 are repeatedly executed twenty-first times (in subtotal, hundred and twenty-six times) and then the instructions N+7 and N+8 are executed each once (in subtotal, two times). Thus, in total, hundred and twenty-eight executions of instructions are performed. Following to the instruction N+8, the twenty-second fetched instructions N+9 to N+12 become NOP (invalid) by forcefully negating the instruction execution control signal with the execution control signal generation unit 910 in the execution stage. When "127" is set in the register R13, the instructions N+7 to N+12 are repeatedly executed twenty-first times and then the instructions N+7 is executed once, and thus hundred and twenty-seven executions of instructions are performed in total. The fetched instructions N+8 to N+12 following to the instruction N+7, become NOP.

Figure 12:
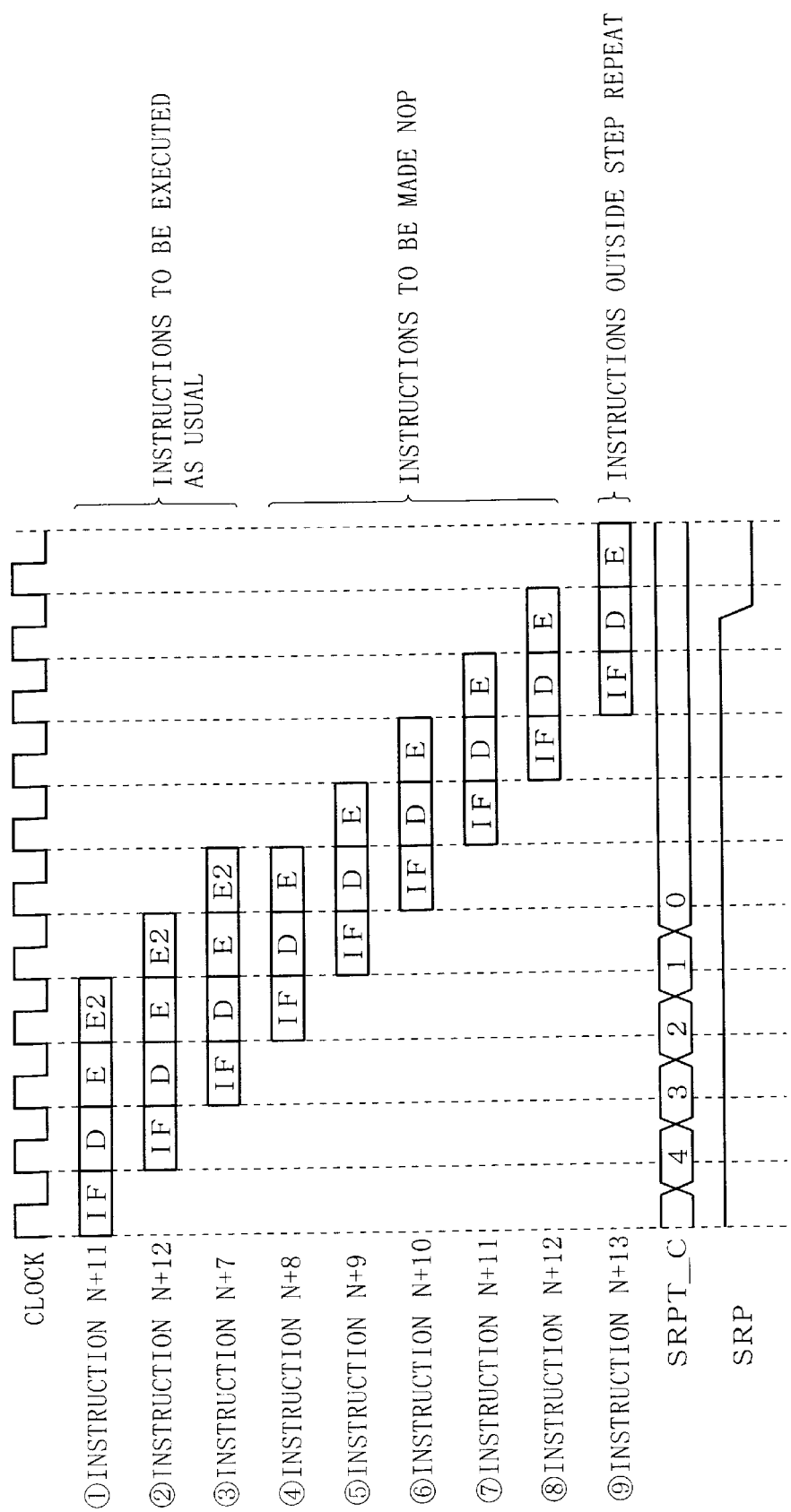
FIG. 12 is an illustration showing a pipeline control by the control unit in accordance with the first preferred embodiment of the present invention.

FIG. 12 illustrates a state where "127" is set in the register R13. For simple illustration, only a pipeline operation of an instruction executed in the second operation unit 117 is shown. The instruction N+12 is the last instruction of the instruction stream to be step-repeated and its instruction address agrees with the value of the SRPT_E register 186. At the twenty-first fetch of the instruction N+12 indicated by $\hat{2}$, the instruction N+7 designated by the SRPT_S register 184 is fetched since the value of the SRPT_C register 188 is not "0". Since the value of the SRPT_C register 188 becomes "0" when the instruction N+7 indicated by $\hat{3}$ is executed, after fetching the instruction N+12 indicated by $\hat{8}$, the instruction address is incremented as usual to fetch the instruction N+13 indicated by $\hat{9}$. All the instructions N+8 to N+12 indicated by $\hat{4}$ to $\hat{8}$ executed from the time when the value of the SRPT_C register 188 becomes "0" to the time when the step repeat processing is terminated (the value of the SRP bit 43 becomes "0") are made NOP by the execution control signal generation unit 910. Being made NOP, these instructions do not operate in the pipeline stage represented by E2.

Thus, the data processor of the first preferred embodiment sequentially negates the instructions transferred from the data latch group 908 when the repeat end flag 903 indicates the achievement state ("1").

Therefore, since the instructions fetched in the data latch group 908 can be surely negated after the total execution count of the instructions in the instruction stream designated by the step repeat instruction reaches the execution instruction number, the execution can be performed accurately the designated number (execution instruction number) of times of instructions while the instruction included in the instruction stream are repeated.

As a result, even when the number of instruction executions is dynamically determined during the program execution, a program designer can easily make a program by utilizing the step repeat processing.

The Second Preferred Embodiment

In the configuration of the first preferred embodiment, when a lot of instructions, e.g., thirty instruction, are included in the instruction stream to be step-repeated, if the value of SRPT_C register 188 becomes "0" when the first instruction of the instruction stream is executed, the remaining twenty-nine instructions are executed while being made NOP.

Figure 13:
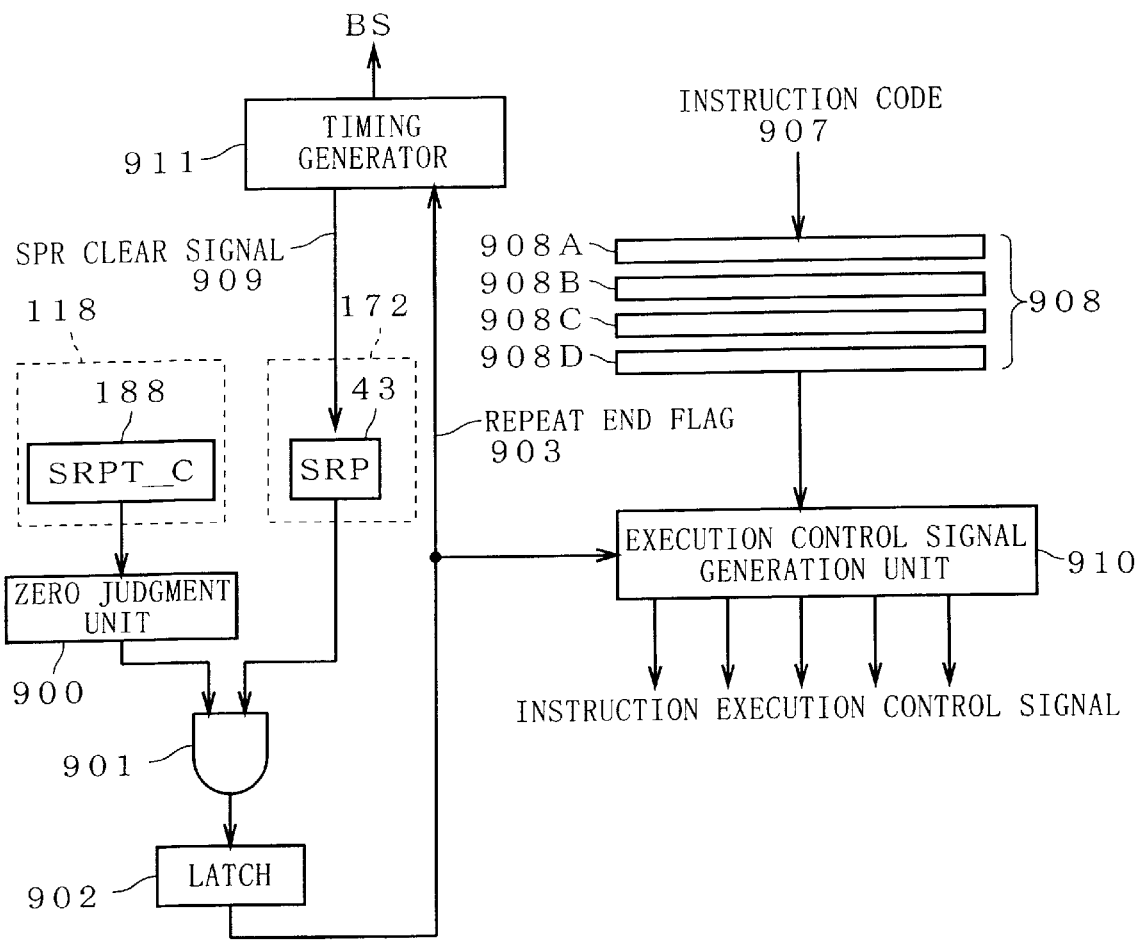
FIG. 13 is an illustration showing a configuration of a control unit in accordance with a second preferred embodiment of the present invention.

Considering this case, a data processor of the second preferred embodiment is a device to perform such a control as to branch to an instruction next to the instruction designated by the SRPT_E register 186 (to be executed after the step repeat processing) if the value of the SRPT_C register 188 becomes "0" during the step repeat processing., FIG. 13 is an illustration showing a configuration of the control unit 112 in the data processor in accordance with the second preferred embodiment of the present invention. As shown in FIG. 13, a timing generator 911 generates the SRP clear signal 909 and a branch control signal BS on the basis of the repeat end flag 903. The configuration of the second preferred embodiment is the same as that of the first preferred embodiment of FIG. 10 except that a latch 904 and the AND gate 905 generating the last instruction flag 906 are omitted.

Branch execution is the same as a usual one, and pipeline stages from the IF stage or the D stage on are flashed as required. Specifically, instructions fetched before the execution of branch and unexecuted are erased. The branch-target instruction address is calculated in the first operation unit 116 like the usual branch instruction, and set in the IA 181 over the JA bus 323. In a case of the branch instruction, the branch-target address is obtained by addition of a value of the EPC 194 given over the S3 bus 303 and a desired branch shift given through a not-shown path. In a case of the branch accompanying the completion of the step repeat processing, the branch-target address is obtained by addition of the value of the SRPT_E register 186 and an additionally-given immediate value "1". This series of operations are controlled by the instruction decode unit 119 (see FIG. 2) on the basis of the branch control signal BS generated in the timing generator 911.

Figure 14:
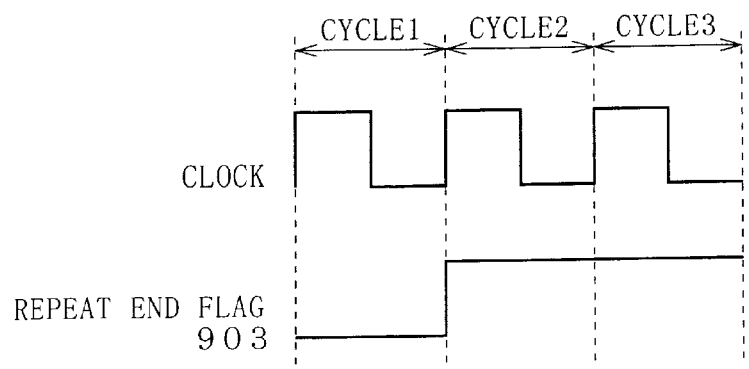
FIG. 14 is a timing chart showing an operation of the control unit in accordance with the second preferred embodiment of the present invention.

Referring to FIG. 14, an operation timing of the timing generator 911 will be discussed. When the (execution instruction number)-th instruction designated by the SRPT_C register 188 i.e., the last instruction is executed, the repeat end flag 903 is asserted in a cycle 2 and the timing generator 911 generates various branch control signals BS by using the asserted repeat end flag 903 as a trigger. With the branch control signal BS, the following branch operation is performed.

In the cycle 2, the value of the SRPT_E register 186 is read out to the S3 bus 303. In a cycle 3, the value on the S3 bus 303, i.e., the value of the SRPT_E register 186 is read into the first operation unit 116 and added to the immediate value "1" read in at the same timing. The branch-target instruction address thus generated is immediately set into the IA 181. Further, the timing generator 911 asserts the SRP clear signal 909 during the cycle 3.

Figure 15:
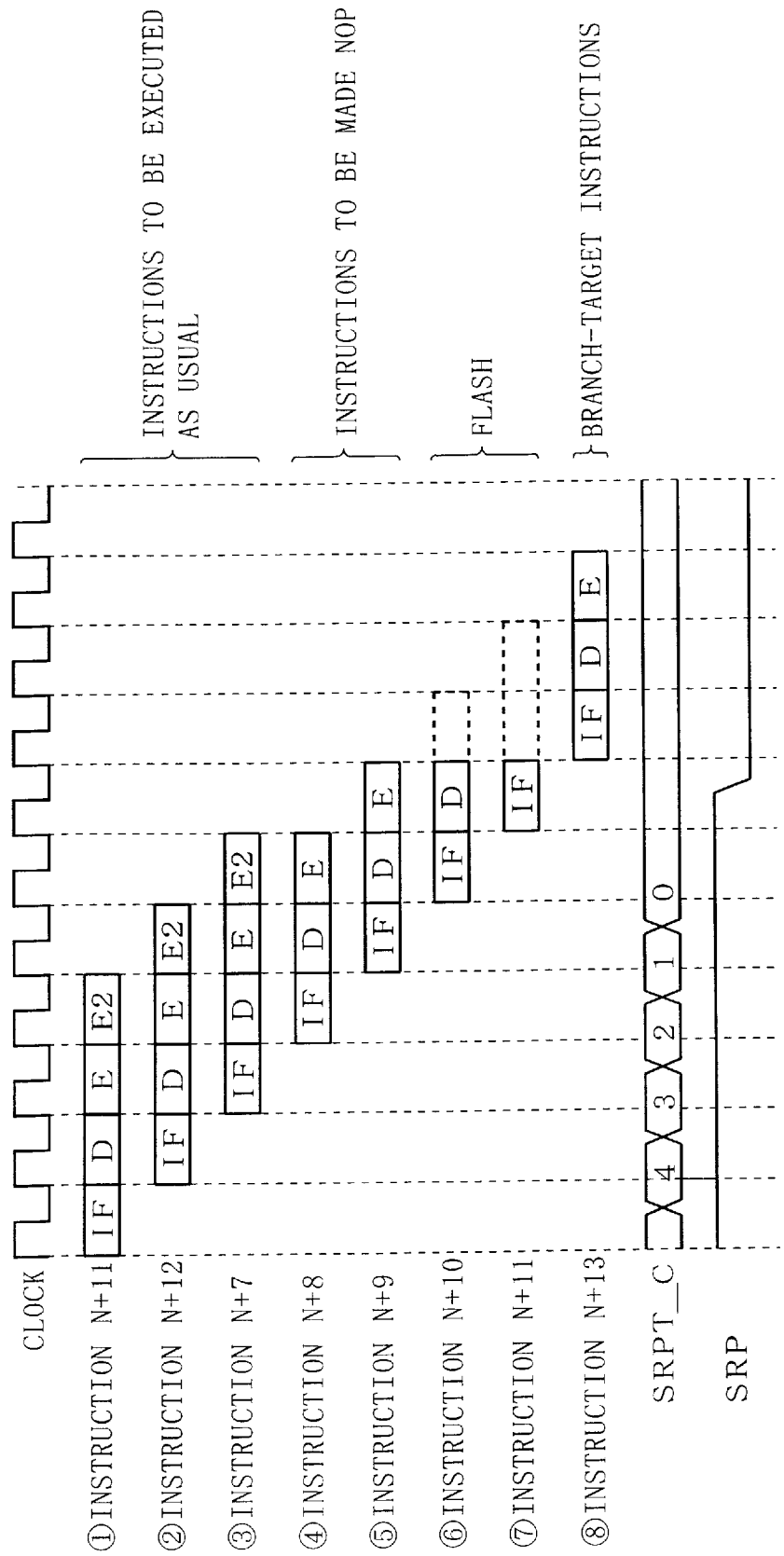
FIG. 15 is an illustration showing a pipeline control by the control unit in accordance with the first preferred embodiment of the present invention.

FIG. 15 illustrates an operation in a case where "127" is set in the register R13 in the program of FIG. 11. When the value of the SRPT_C register 188 is made "0" by execution (E) of the instruction N+7 indicated by 3̂ (a cycle 1 of FIG. 14), a branch is executed to the instruction N+13 in accordance with a cycle after the next cycle, i.e., a cycle for executing the instruction N+9 indicated by 5̂ which is made NOP. At this time, the instruction N+8 indicated by 4̂ and the instruction N+9 indicated by 5̂ are executed while being made NOP and the instruction N+10 indicated by 6̂ and the instruction N+11 indicated by 7̂ which have been already fetched are cancelled by a flash operation of the pipeline. The instruction N+13 indicated by 8̂ which is branch target is fetched from a cycle subsequent to the branch execution.

Fetching of the instruction N+13 to be executed after execution of the step repeat instruction can be started in this operation of FIG. 15 earlier than in the operation of FIG. 12 in the first preferred embodiment by one cycle.

Thus, the timing generator 911 of the data processor of the second preferred embodiment generates the branch control signal BS designating fetch of an instruction to be executed after execution of the step repeat instruction by using a change of the repeat end flag 903 into "1" as a trigger while asserting the SRP clear signal 909 (indicating that instruction executions are made the execution instruction number of times) at a predetermined timing.

Therefore, after the total execution count of the instructions in the instruction stream to be step-repeated reaches the execution instruction number, the instruction to be executed after the step repeat instruction can be immediately executed.

Thus, the data processor of the second preferred embodiment can further improve the performance of the step repeat processing of the data processor of the first preferred embodiment with so small addition of a control unit, i.e., the timing generator 911.

The Third Preferred Embodiment

Addition to the resources (the SRP bit 43, the SRPT_S register 184, the SRPT_E register 186, the SRPT_C register 188 and their peripheral devices such as the comparator) for the block repeat as shown in FIG. 3 and the like, a resource for the background-art block repeat, as shown in the open gazette 1, where an instruction stream designated in the block are repeatedly executed the predetermined number of times, is provided to add a block repeat function.

For example, there may be a case where a bit indicating whether or not there is execution of block repeat is added to the PSW of FIG. 6, a register storing an address of the first instruction of the instruction stream to be block-repeat-processed, a register storing an address of the last instruction of the instruction stream to be block-repeat-processed, and a register storing the number of repeat executions of the instruction stream to be block-repeat-processed are so provided as to have the same connection as the SRPT_S resister 184, the SRPT_E resister 186 and the SRPT_C resister 188 in the PC unit 118, and peripheral devices corresponding to the latch 189, the decrementor 190, the comparator 187 and the latch 185 of FIG. 3 are added in the PC unit 118 with respect to these three registers.

A data processor of the third preferred embodiment has the above configuration where the resources for block repeat are added to the resources for step repeat. The step repeat function may be achieved with the configuration of either the first preferred embodiment or the second preferred embodiment.

Therefore, the data processor of the third preferred embodiment allows such selection as to perform a block repeat processing using the resources for block repeat when the number of executions is determined in advance and perform the step repeat processing using the resources for step repeat as shown in FIG. 3 and the like when the number of executions is dynamically determined during execution, thereby ensuring easier programming. Further, this preferred embodiment also allows a hierarchical use to perform the step repeat processing in an instruction stream designated in the block repeat processing.

Furthermore, there may be a case where without providing additional resources, the resources for step repeat as shown in FIG. 3 and the like are used as the resources for block repeat, to allow selection on use of the resources for step repeat or block repeat. In this case, however, the above hierarchical use is impossible. Further, it is needless to say that some means for judging whether the step repeat or the block repeat should be performed is needed, but the means can be achieved easily. For example, a bit for indicating whether the block repeat is being performed or not is added to the PSW of FIG. 6, and the selection can be made with the state of the PSW.

The Fourth Preferred Embodiment

Some recent data processors have a function for making a fetched instruction NOP in accordance with a flag value, i.e., a conditional execution function. For example, a basic configuration is disclosed in FIG. 27 and the like of International Open Gazette No. WO98/33115 (hereinafter, referred to as "open gazette 2"). To perform such a conditional execution, it is only necessary to provide an execution condition judgment unit for judging whether a predetermined instruction corresponding to an execution condition instruction should be executed or made NOP on the basis of a flag information held in the PSW and an execution condition defined in the execution condition instruction and an execution control signal generation unit for generating a final instruction execution control signal on the basis of an instruction code of the predetermined instruction and the judgment result of the execution condition judgment unit.

Further, in the open gazette 2, one sub-instruction designates an execution condition of another sub-instruction, to perform a conditional execution. As another method, for example, like an instruction disclosed in "ACORN RISC MACHINE FAMILY DATA MANUAL", pages 2–29, by VLSI Technology inc., an execution condition is designated in a specified field in an instruction word defining the predetermined instruction, to perform a conditional execution. To perform the conditional execution shown in the document, it is only necessary to provide an execution condition judgment unit for judging whether the predetermined instruction should be executed or made NOP on the basis of a flag information held in the PSW and an execution condition defined in an instruction word and an execution control signal generation unit for generating a final instruction execution control signal on the basis of an instruction code of the predetermined instruction and the judgment result of the execution condition judgment unit.

In a case of a data processor having both the step repeat function and the above conditional execution function, the execution control signal generation unit for making the instruction NOP is shared by both the functions. This can be achieved by supplying a result of simple logic operation between the repeat end flag 903 and the execution condition judgment result.

Figure 16:
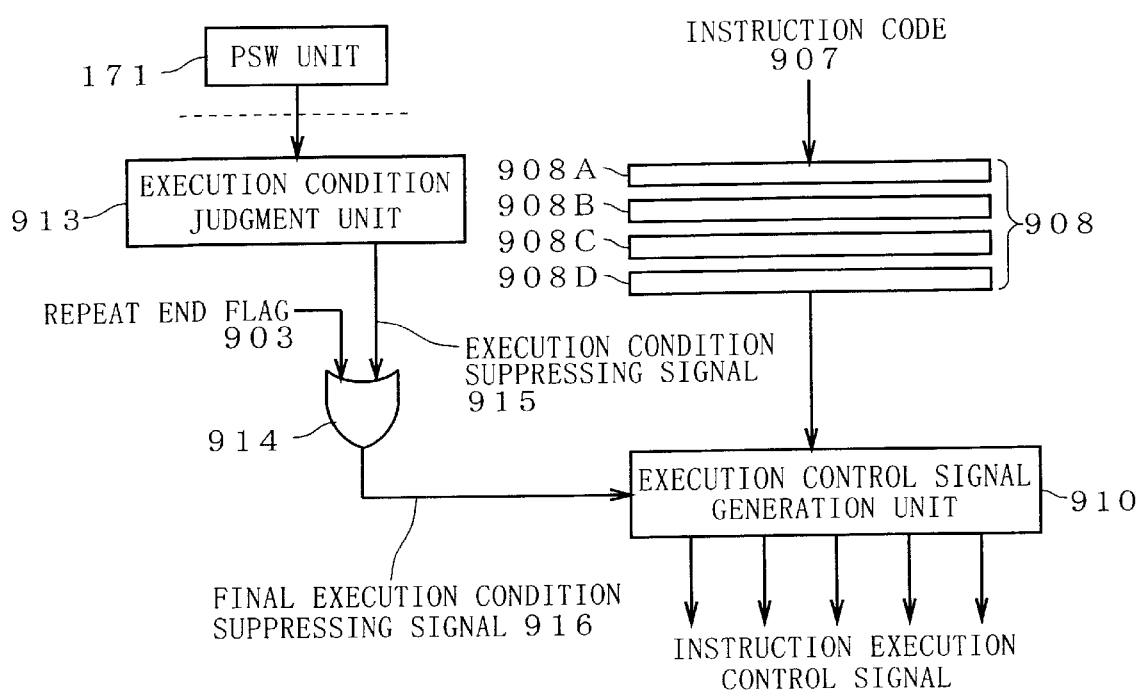
FIG. 16 is an illustration showing a configuration of a control unit in accordance with a fourth preferred embodiment of the present invention.

FIG. 16 is an illustration showing a configuration of a control unit of a data processor in accordance with the fourth preferred embodiment of the present invention. FIG. 27 of the open gazette 2 shows a case where two execution condition judgment units and two execution control signal generation units are provided and connected with four execution suppressing signals. FIG. 16 shows a case, for simple illustration, where one execution control signal generation unit 910 and one execution condition judgment unit 913.

The execution condition judgment unit 913 judges a flag value held in the PSW unit 171 on the basis of the execution condition designated by some of the instruction code and outputs an execution condition suppressing signal 915 indicating whether execution ("0") or suppressing ("1") on the basis of whether the execution condition is held or not. An Or gate 914 performs a logical sum operation between the repeat end flag 903 and the execution condition suppressing signal 915 and outputs an operation result as a final execution condition suppressing signal 916. Therefore, when the repeat end flat 903 or the execution condition suppressing signal 915 is "1", the final execution condition suppressing signal 916 becomes "1", to indicate suppressing. As the configuration for generating the repeat end flag 903, both the configuration of the first preferred embodiment shown in FIG. 10 and that of the second preferred embodiment shown in FIG. 13 may be used.

The execution control signal generation unit 910 performs such an operation as not to generate the instruction execution control signal when the final execution condition suppressing signal 916 is "1".

Thus, the step repeat function and the conditional execution function can share the execution control signal generation unit 910 only by adding the OR gate 914 to the hardware configuration for the step repeat function.

The conditional execution function is effective means for improving the performance of an information processor since it can reduce penalties caused by branches. Therefore, since the fourth preferred embodiment has both the step repeat function and the conditional execution function, a data processor of much higher performance can be achieved. Further, it is very effective in terms of hardware cost that the these functions can share a NOP device for making an instruction NOP.

While the invention has been shown and described in detail, the foregoing description is in all aspects illustrative and not restrictive. It is therefore understood that numerous modifications and variations can be devised without departing from the scope of the invention.

What is claimed is:

1. A data processor configured to perform a repeat operation of repeating sequential execution of a plurality of instructions in a program, the repeating operation starting in response to a repeat instruction in the program, the data processor comprising:

a counting circuit configured to count every time one instruction of said plurality of instructions is executed;

a judgment circuit configured to judge whether said counting circuit counts a predetermined number of times; and an instruction execution control portion configured to control an execution sequence to return to a head instruction of said plurality of instructions following a last instruction in said plurality of instructions in response to a first result output from said judgment circuit indicating that said counting circuit does not count the predetermined number of times.

2. The data processor according to claim 1, wherein said instruction execution control portion includes an execution control signal generation unit configured to receive instructions in the program and to generate execution control signals for execution of instructions based on said received instructions while negating the execution control signals in response to a second result of said judgment circuit indicating that said counting circuit counts the predetermined number of times.

3. The data processor according to claim 2, further comprising:

an information storing portion configured to store information with respect to an execution condition; and an execution condition judgment unit configured to judge whether the information stored in said information storing portion satisfies the execution condition, wherein said execution control signal generation unit negates each of the execution control signals in accordance with an output of said judgment circuit and an output of said execution condition judgment unit.

4. The data processor according to claim 2, wherein said instruction execution control portion is configured to provide instructions until the last instruction in said plurality of instructions using said execution control signal generation unit, after said judgment circuit outputs the second result, and said execution control signal generation unit negates a control signal for execution of at least one instruction in said plurality of instructions next to a final instruction finally executed in said repeat operation until the last instruction, in response to the second result of said judgment circuit.

5. The data processor according to claim 4, further comprising:
an information storing portion configured to store a bit set in response to said repeat instruction, the bit indicating whether the repeat operation is active; and
a second judgment circuit configured to judge whether a fetched instruction is the last instruction, wherein
the bit of said information storing portion is reset in accordance with an output of said judgment circuit and an output of said second judgment circuit, indicating that the fetched instruction is the last instruction.

6. The data processor according to claim 1, further comprising:
an address register configured to store and output addresses to a memory to fetch said plurality of instructions, wherein
said instruction execution control portion sets an address specifying a next instruction in the program next to the last instruction into said address register in response to a second result of the judgment circuit.

7. The data processor according to claim 6, further comprising:
an information storing portion configured to store a bit set in response to said repeat instruction, the bit indicating whether the repeat operation is active, wherein
said instruction execution control portion includes a timing control portion configured to generate a control signal indicating fetch of the next instruction and to reset the bit of said information storing portion in response to the second result.

8. The data processor according to claim 1, wherein said counting circuit includes a storing portion configured to store information for designating the predetermined number of times, the information being written into the storing portion in response to the repeat instruction.

9. The data processor according to claim 8, wherein said counting circuit further includes a decrementer configured to decrement a value stored in said storing portion, and
said judgment circuit includes a zero judgment circuit configured to judge whether the value of said storing portion is zero.

10. The data processor according to claim 1, wherein said repeat instruction has a field of information for specifying the predetermined number of times.

11. The data processor according to claim 10, wherein the field of information specifies a register storing a value indicating the predetermined number of times.

12. The data processor according to claim 1, further comprising:
a storing portion configured to store an address specifying the head instruction.

13. The data processor according to claim 12, wherein
said storing portion provides the stored address when the execution sequence returns to the head instruction from the last instruction, and the stored address is written into the storing portion in response to said repeat instruction.

14. The data processor according to claim 12, further comprising:
a second storing portion configured to store an address specifying the last instruction.

15. The data processor according to claim 1, wherein said repeat instruction specifies said plurality of instructions.

16. The data processor according to claim 15, wherein said repeat instruction has a field of information for specifying an address of the last instruction, and an address of the head instruction is specified by adding an address of said repeat instruction to a fixed value.

17. A data processor configured to repeatedly perform sequential execution of first to N-th instructions in a program in response to a repeat instruction in the program, comprising:
a program counter (PC) unit configured to sequentially generate addresses of said first to N-th instructions to apply to a memory; and
an instruction execution control portion configured to control said PC unit in response to the repeat instruction, to repeatedly output the addresses of said first to N-th instructions K times, and then to output the addresses of said first to L-th instructions, wherein L is at least one and L is less than N, and then to output the address of the (N+1)st instruction in the program, without outputting the addresses of the (L+1)-th to N-th instructions.

* * * * *